(12) United States Patent
Mark et al.

(10) Patent No.: US 8,342,453 B2
(45) Date of Patent: Jan. 1, 2013

(54) SYSTEM FOR AIRBORNE TRANSPORT OF FLAMMABLE LIQUIDS

(75) Inventors: John P. Mark, Oshkosh, WI (US); Alan Cheeseman, Thunder Bay, CA (US)

(73) Assignee: Thunder Bay Aircraft Leasing Inc., Thunder Bay, Ontario (CA)

( * ) Notice: Subject to any disclaimer, the term of this patent is extended or adjusted under 35 U.S.C. 154(b) by 507 days.

(21) Appl. No.: 12/702,385

(22) Filed: Feb. 9, 2010

(65) Prior Publication Data
US 2011/0192934 A1 Aug. 11, 2011

(51) Int. Cl.
*B64D 1/00* (2006.01)
(52) U.S. Cl. ............ 244/136; 244/135 R; 244/135 A
(58) Field of Classification Search ............ 244/136, 244/135 C, 135 R, 135 A; 220/560.11, 560.12, 220/560.14, 4.15, 4.14
See application file for complete search history.

(56) References Cited

U.S. PATENT DOCUMENTS

| | | | | |
|---|---|---|---|---|
| 3,273,651 A | * | 9/1966 | Andrews | 169/53 |
| 5,279,481 A | * | 1/1994 | Trotter et al. | 244/136 |
| 6,491,255 B1 | * | 12/2002 | Bracken et al. | 244/135 R |
| 7,111,809 B1 | * | 9/2006 | Tai et al. | 244/135 R |
| 7,717,356 B2 | * | 5/2010 | Petersen | 239/8 |
| 7,857,260 B2 | * | 12/2010 | Morgia et al. | 244/136 |
| 2002/0084383 A1 | * | 7/2002 | Maeda | 244/136 |
| 2006/0273224 A1 | * | 12/2006 | Hoffjann et al. | 244/136 |
| 2006/0278761 A1 | * | 12/2006 | Cutler et al. | 244/135 A |
| 2009/0032645 A1 | * | 2/2009 | Cutler et al. | 244/135 A |
| 2009/0050743 A1 | * | 2/2009 | Barbosa et al. | 244/135 A |

* cited by examiner

*Primary Examiner* — Christopher P Ellis
*Assistant Examiner* — Medhat Badawi
(74) *Attorney, Agent, or Firm* — James R. Eley; Michael A. Forhan; Eley Law Firm Co., LPA

(57) ABSTRACT

A system for airborne transport of flammable liquids with an aircraft. A fuel tank and a reservoir, each for storing flammable liquids, are joined to the aircraft. A fuel jettison subsystem is coupled between an interior portion and an exterior of the reservoir to selectably expel fuel from the reservoir to an exterior portion of the aircraft. The fuel jettison subsystem includes a jettison valve opening formed in the reservoir. A lid selectably closes off the opening. A biasing member urges the lid away from the jettison valve opening. A solenoid retains the lid in the jettison valve opening when unactuated and releases the lid when actuated. A jettison linkage is coupled to the solenoid, the jettison linkage being operable to actuate the solenoid. The t lid is urged away from the jettison valve opening by the biasing member when the t solenoid is actuated by the jettison linkage.

21 Claims, 7 Drawing Sheets

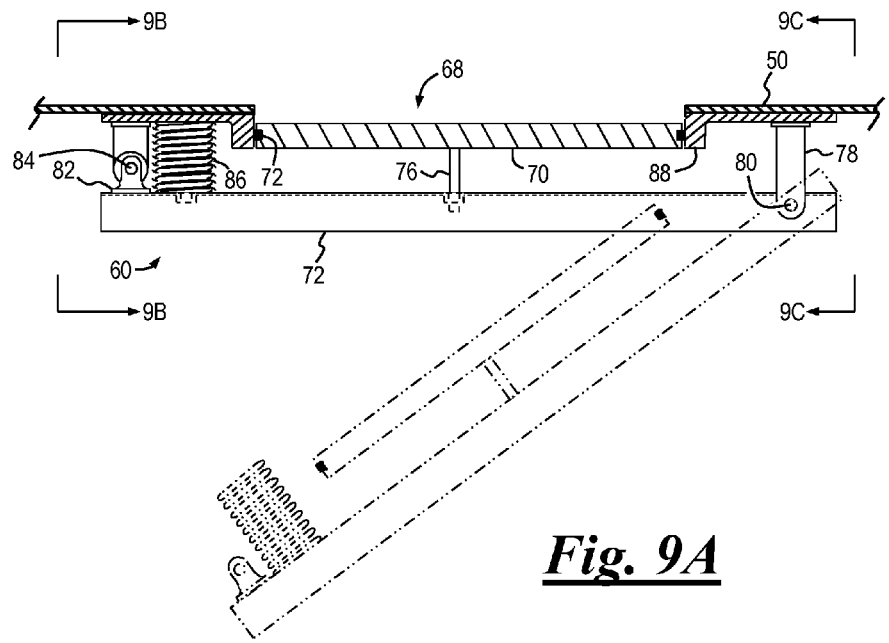
*Fig. 9A*
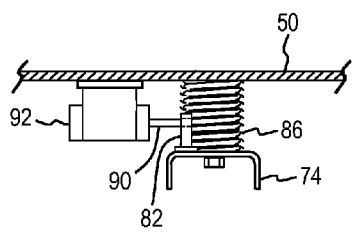
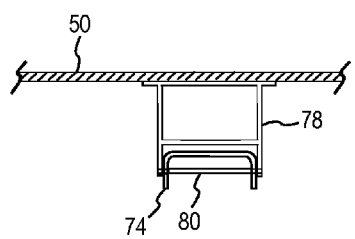
*Fig. 9B*          *Fig. 9C*

SYSTEM FOR AIRBORNE TRANSPORT OF FLAMMABLE LIQUIDS

FIELD

The present invention relates generally to a system for transporting flammable liquids, in particular to an aircraft incorporating the system and being usable to transport flammable liquids to remote sites.

BACKGROUND

Consumers of flammable liquids, such as gasoline, kerosene, jet fuel, aviation gas and heating oil are often located at remote sites that are inconvenient or not accessible by common ground-based transport. For example, industrial mining sites and forward operating bases in military applications are often not served by improved roads. Similarly, remote villages in many wilderness or arctic areas are not accessible by land or water routes during certain seasons. Finally, remote wilderness camps and lodges are often situated far from any land or water routes and within protected wilderness areas that do not allow ground access.

One way to transport bulk flammable liquids to the inaccessible remote sites is to utilize small and medium-sized aircraft. Aircraft can be equipped with tundra tires and rugged landing gear for landing and takeoff from unimproved landing strips and beaches. Likewise, aircraft can be equipped with floats for operation upon lakes and rivers, or skis for operation upon ice and snow covered surfaces. Special consideration must be given to the air transportation of bulk flammable liquids. Traditional methods of shipping fuel within aircraft cargo bays subjects the container(s) to possible damage during loading and unloading as well as in flight with an attendant risk of explosion or fire. Another drawback of many fuel containers is that they are not conveniently sized or shaped to efficiently fit the geometries of aircraft cargo bays. Loading and unloading containers of flammable liquids is laborious and potentially hazardous. Improper stowing of the containers in an aircraft cargo bay can also result in a weight-and-balance configuration that is outside the safe operating envelope of the aircraft. Fuel containers that are flown inside conventional aircraft are vented into the cargo bays or not vented at all. Aircraft cargo bays are not an intrinsically safe environment and therefore pose a hazard when fuel containers vent or accidentally leak while transported within. Non vented fuel containers are subjected to expanding and contracting forces as an aircraft descends and ascends, respectively. Lastly, containers of flammable liquids can become hazardous if they are improperly secured in the aircraft and are dislodged during aircraft operation. There is a need for a way to safely transport bulk flammable liquids in aircraft.

SUMMARY

A system for airborne transportation of flammable liquids is disclosed according to an embodiment of the present invention. Storage containers are joined to the aircraft at locations that are appropriate to the aircraft's center of gravity, so as to maintain an appropriate weight and balance for the aircraft throughout its range of operating limitations with or without flammable liquids in the containers. Filler openings in the storage containers are each selectable and closable by a cap; the openings allow for rapid and efficient filling of the storage containers with flammable liquids. The storage containers are intrinsically safe. The cockpit of the aircraft is protected from flammable liquids by a vented double walled cavity as well as a vapour barrier. A vent system is installed on each storage container and vented to a safe location on the exterior of the aircraft. The vent system accommodates both negative and positive pressure changes that occur during flight operations as well as emergency dump situations. A fuel jettison system allows for rapid removal of flammable liquids from the storage containers in the event of an emergency. The fuel jettison system may include a biased lid to ensure reliable operation of the jettison system under low-temperature and icing environmental conditions.

An aspect of the present invention is a system for transport of flammable liquids using an aircraft. A fuel tank and a reservoir, each for storing flammable liquids, are joined to the aircraft. A fuel jettison subsystem is coupled between an interior portion and an exterior portion of the reservoir to selectably expel fuel from the reservoir to an exterior portion of the aircraft. The fuel jettison subsystem includes a jettison valve opening formed in the reservoir. A lid selectably closes off the opening. A biasing member urges the lid away from the jettison valve opening. A solenoid retains the lid in the jettison valve opening when unactuated and releases the lid when actuated. A jettison linkage is coupled to the solenoid, the jettison linkage being operable to selectably actuate the solenoid. The lid is urged away from the jettison valve opening by the biasing member when the t solenoid is actuated by the jettison linkage.

Another aspect of the present invention is a system for transport of flammable liquids using an aircraft. The system comprises a fuel tank for storing flammable liquids, the fuel tank being joined to the aircraft. The fuel tank has a first selectably closable fill port and further includes a first selectably closable discharge port. A reservoir for storing flammable liquids independent of the fuel tank is also joined to the aircraft. The reservoir has a second selectably closable fill port and further includes a second selectably closable discharge port.

A fuel jettison subsystem is coupled between an interior portion and an exterior portion of the reservoir to selectably expel fuel from the reservoir to an exterior portion of the aircraft in the event of an exigent circumstance wherein landing the aircraft with fuel in the fuel tank and the reservoir inordinately increases the risk of landing. The subsystem includes a first jettison valve opening formed in the reservoir. A first lid selectably closes off the first jettison valve opening. A first biasing member urges the first lid away from the first jettison valve opening. A first solenoid retains the first lid in the first jettison valve opening when unactuated and releases the first lid when actuated. A jettison linkage is coupled to the first solenoid, the jettison linkage being operable to selectably actuate the first solenoid. The first lid is urged away from the first jettison valve opening by the first biasing member when the first solenoid is actuated by the jettison linkage.

The system also includes a first suction valve coupled between an interior portion and an exterior portion of the fuel tank to selectably admit air to the fuel tank, the first suction valve being closed below a predetermined negative pressure threshold in the fuel tank and being open when the pressure in the fuel tank exceeds the negative threshold. A second suction valve is coupled between the interior portion and the exterior portion of the reservoir to selectably admit air to the reservoir, the second suction valve being closed below a predetermined negative pressure threshold in the reservoir and being open when the pressure in the reservoir exceeds the negative threshold.

The system further includes a first pressure relief valve coupled between the interior portion and the exterior portion of the fuel tank to selectably expel at least one of air and fuel vapours from the fuel tank, the first pressure relief valve being closed below a predetermined positive pressure threshold in the fuel tank and being open when the pressure in the fuel tank exceeds the positive threshold. A second pressure relief valve is coupled between the interior portion and the exterior portion of the reservoir to selectably expel at least one of air and fuel vapours from the reservoir, the second pressure relief valve being closed below a predetermined positive pressure threshold in the reservoir and being open when the pressure in the reservoir exceeds the positive threshold.

BRIEF DESCRIPTION OF THE DRAWINGS

Further features of the inventive embodiments will become apparent to those skilled in the art to which the embodiments relate from reading the specification and claims with reference to the accompanying drawings, in which:

FIG. 9A is a side elevational view showing details of the jettison valve of FIG. 8;

FIG. 9B is a first end elevational view showing additional details of the jettison valve of FIG. 8;

FIG. 9C is a second end elevational view showing further details of the jettison valve of FIG. 8;

DETAILED DESCRIPTION

Figure 1:
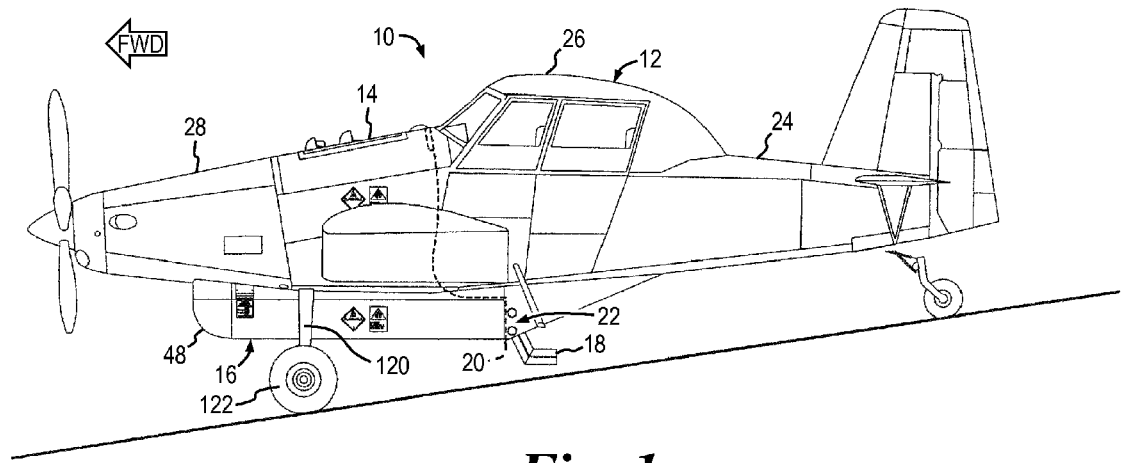
FIG. 1 shows the general arrangement of a system for airborne transportation of flammable fluids according to an embodiment of the present invention.

The general arrangement of a system 10 for airborne transportation of flammable liquids is shown in FIG. 1, the system being incorporated into an aircraft 12. System 10 includes a hopper fuel tank 14, an auxiliary fuel tank 16, a fuel cargo jettison subsystem 18, a fuel cargo vent subsystem 20 and a fuel cargo offload subsystem 22.

Figure 2:
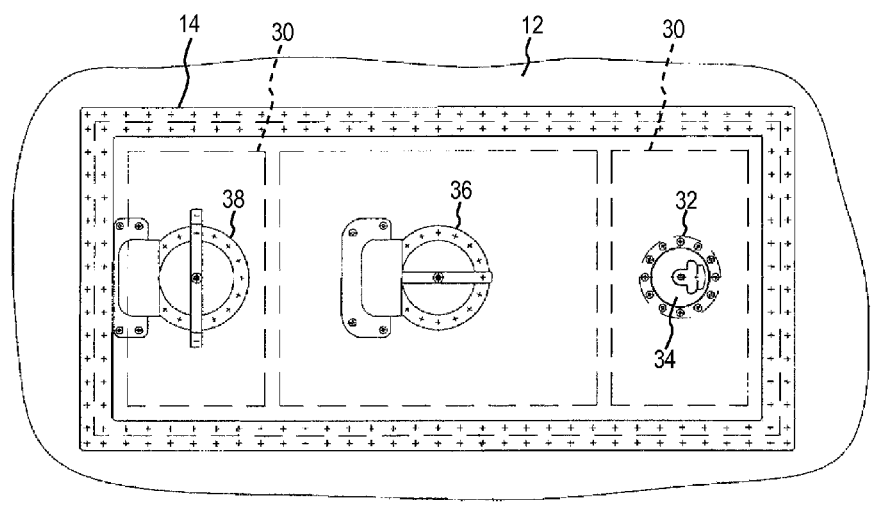
FIG. 2 is a top plan view of a hopper fuel tank of the system of FIG. 1.
Figure 3:
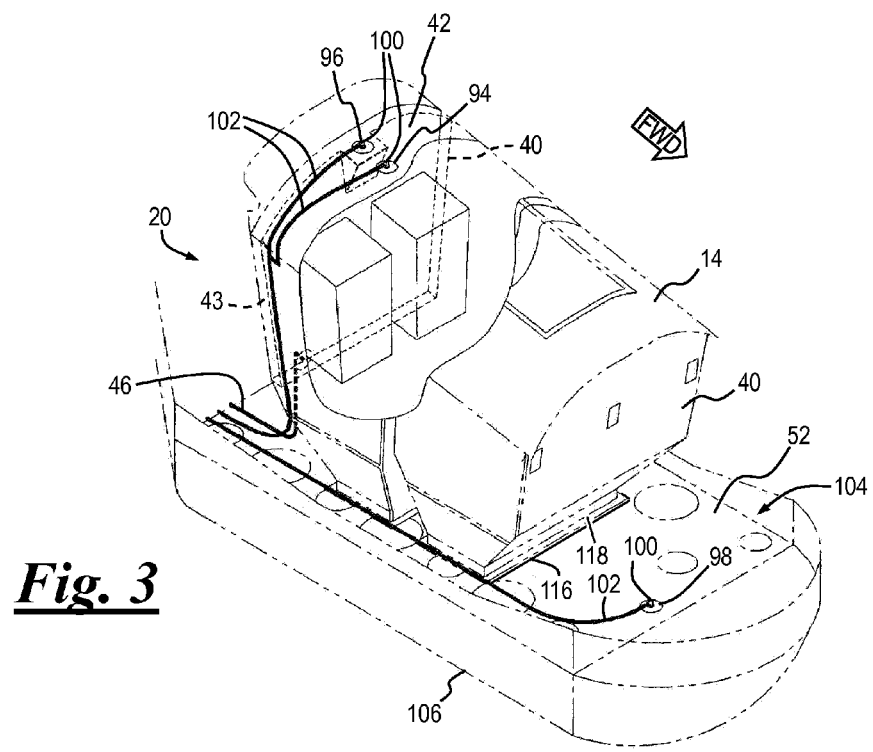
FIG. 3 shows a venting subsystem of the system of FIG. 1.
Figure 4:
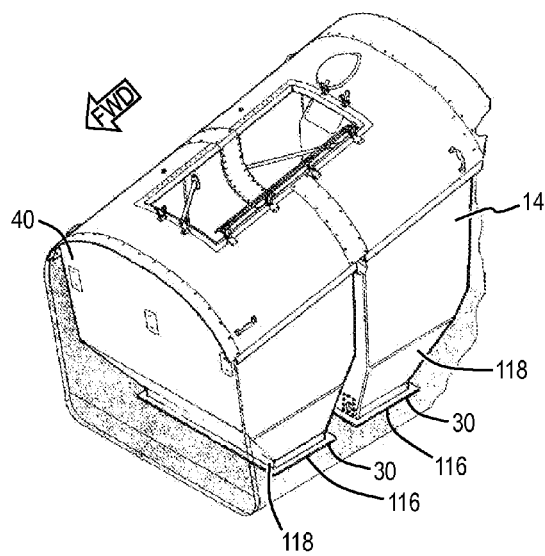
FIG. 4 shows further details of the hopper fuel tank of FIG. 2.

As shown in FIG. 1, hopper fuel tank 14 is located in a fuselage 24 of aircraft 12, forward of a pilot compartment 26 and aft of an engine compartment 28. With reference now to FIGS. 2 through 4, hopper fuel tank 14 may include at least one selectably removable, sealable access panel 30 to accommodate cleaning and inspection of the hopper fuel tank. Hopper fuel tank 14 further includes a fill port 32 having a cap 34 that is selectably removable to fill the hopper fuel tank with flammable liquids. A float-type vent valve 36 is coupled to fuel cargo vent subsystem 20 to allow venting of gases in hopper fuel tank 14 to the exterior of aircraft 12 and to provide an over flow path to the exterior of aircraft 12 for flammable liquids in the tank 14. Vent valve 36 closes when aircraft 12 is not level, is accelerating, or is decelerating, to prevent fuel from escaping under these conditions.

A pressure relief valve 38 in communication with hopper fuel tank 14 is normally closed off but opens to the exterior of aircraft 12 in the event that the pressure in the hopper tank exceeds a predetermined pressure value, thereby preventing damage to the tank due to an overpressure condition. This can occur, for example, as a result of pressure changes in hopper fuel tank 14 due to changes in the operating altitude of aircraft 12 or the thermal coefficient of expansion of flammable liquids in the hopper fuel tank with vent 36 in a blocked or closed condition.

With reference to FIGS. 3 and 4 together, in one embodiment of the present invention hopper fuel tank 14 may include a sidewall 40 that is spaced apart from a bulkhead 42 of aircraft 12. Together sidewall 40 and bulkhead 42 form a secondary bulkhead 43 with an air space between hopper fuel tank 14 and pilot compartment 26 (FIG. 1), the secondary bulkhead having a float-type vent valve 44 and a hollow drain tube 46 extending from the secondary bulkhead to the exterior of aircraft 12. Any leakage in secondary bulkhead 43, which is indicative of a leak in hopper fuel tank 14, may detected by inspecting drain 46 at its exit point to the exterior of aircraft 12 for the presence of fuel prior to flight. In the event of an in-flight leakage of hopper fuel tank 14, leaked fluids will be directed into the airstream of aircraft 12 by drain 46.

Hopper fuel tank 14 may be made from any materials that are compatible with flammable liquids and the expected environment for aircraft 12. Example materials include, without limitation, metal such as aluminum and epoxy resins such as Derakane®, available from Ashland Composite Polymers of Columbus, Ohio. Electrically conductive portions of hopper fuel tank 14 may be grounded to the airframe of aircraft 12 in any desired manner, such as with electrically conductive brackets, fasteners, wiring, braids, straps and cables to deter the buildup of static electricity and to route lightning discharge currents in a manner to deter damage to the hopper fuel tank or its contents.

Figure 5:
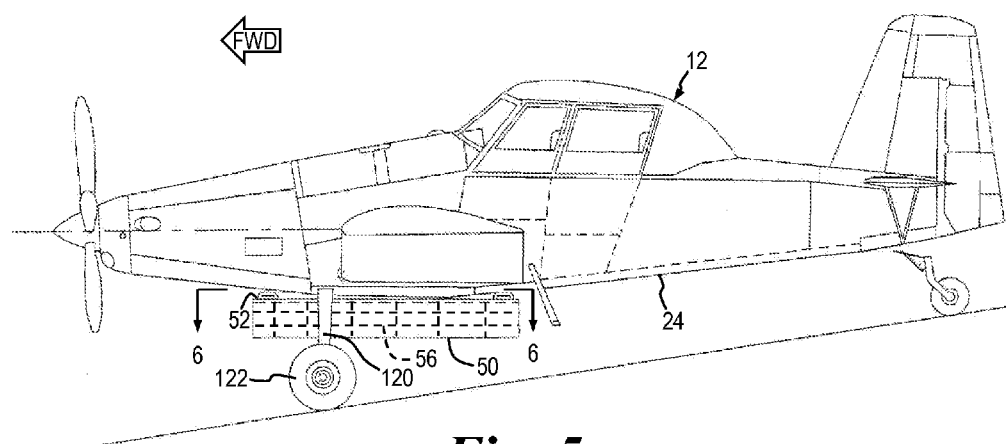
FIG. 5 is a side elevational view of a reservoir of the system of FIG. 1.
Figure 6:
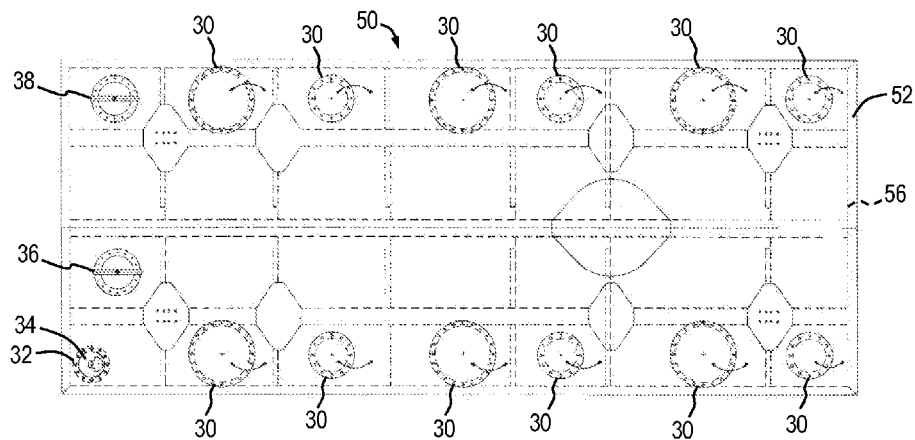
FIG. 6 is a top plan view of the reservoir of FIG. 5.

Referring now to FIGS. 1, 3 and 5, auxiliary fuel tank 16 includes an aerodynamic fairing 48 covering a reservoir tank 50, both the fairing and reservoir being removably attached to a lower portion of fuselage 24 of aircraft 12. A top portion 52 of reservoir 50, shown in FIG. 6, is spaced apart from fuselage 24 and preferably includes one or more access panels 30, a fill port 32, a cap 34 and a pressure relief valve 38. A vent 54 (FIG. 3) is coupled to fuel cargo vent subsystem 20 and is detailed further below.

Reservoir 50 may be made from any materials that are compatible with flammable liquids and the expected environment for aircraft 12. Example materials include, without limitation, metals such as aluminum. Reservoir 50 may further include one or more internal baffles and/or webbing 56 (FIGS. 5, 6) to prevent sloshing of flammable liquids stored therein. Reservoir 50 is preferably attached to fuselage 24 with fasteners that allow the reservoir to be readily removed in the event the reservoir requires servicing. Electrically conductive portions of hopper reservoir 50 may be grounded to the airframe of aircraft 12 in any desired manner, such as with electrically conductive brackets, fasteners, wiring, braids, straps and cables to deter the buildup of static electricity and to route lightning discharge currents in a manner to deter damage to the reservoir or its contents.

Fairing 48 may be made from a single piece, or may comprise a plurality of fairings. Fairing 48 may be made from any materials that are suitable for the expected environment for aircraft 12. Example materials include, without limitation, epoxy fiberglass and metals such as aluminum. Fairing 48 may be painted, if desired, and may further include an opening or a selectable closure such as a hinged lid to provide access to fill port 32 on top portion 52 of reservoir 50. Fairing 48 is preferably attached to fuselage 24 with fasteners that allow the fairing to be readily removed in the event reservoir 50 requires servicing.

Figure 7:
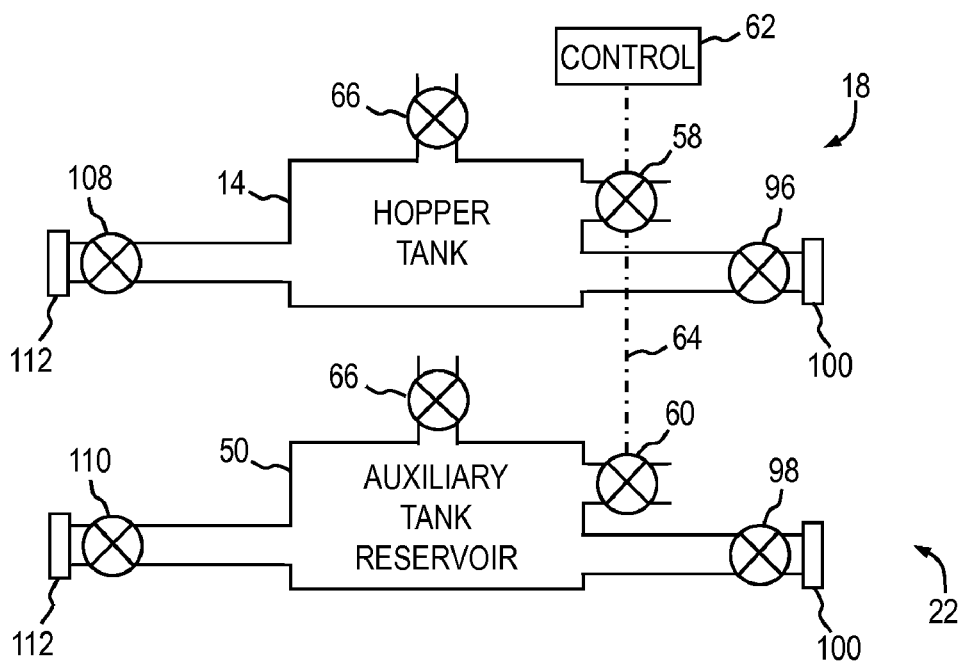
FIG. 7 is a schematic diagram showing the venting subsystem of FIG. 3, a fuel cargo jettison subsystem and a fuel cargo offload subsystem according to an embodiment of the present invention.

A schematic diagram of fuel cargo jettison subsystem 18 is shown in FIG. 7. Hopper fuel tank 14 includes a first jettison valve 58 and reservoir 50 includes a second jettison valve 60, the jettison valves being coupled to a control 62 operable from pilot compartment 26 (FIG. 1), such as a lever or handle, actuable by a mechanical, electrical or pneumatic linkage 64. Hopper fuel tank 14 and reservoir 50 each further include a suction valve 66. In the event that flammable liquids stored in tank 14 and reservoir 50 must be jettisoned, an operator of aircraft 12 operates control 62, causing jettison valves 58, 60 to open. Suction valves 66 open at a resulting low negative pressure in tank 14 and reservoir 50, allowing a high volume of air to flow into the tank and the reservoir as the flammable liquid is rapidly discharged.

Details of jettison valve 60 are shown in FIGS. 8 and 9A-C. Jettison valve 60 selectably closes off an opening 68 in reservoir 50 with a lid 70 having an O-ring seal 72. Lid 70 is coupled to a link 74 by a spacer 76. Link 74, in turn, is hingedly attached to a support 78 at a first end by a fastener 80. A second, opposing end of link 74 includes a locking tab 82 with an aperture 84. A biasing member 86 is attached to link 74 and extends away from the link to contact a housing 88 of jettison valve 60, the biasing member being in a loaded condition when lid 70 closes off opening 68. An output shaft 90 of a solenoid 92 engages aperture 84 when the solenoid is in an unactuated condition, the solenoid and the locking tab cooperating to resist biasing member 86 and keep lid 70 in a closed condition, closing off opening 68.

Figure 8:
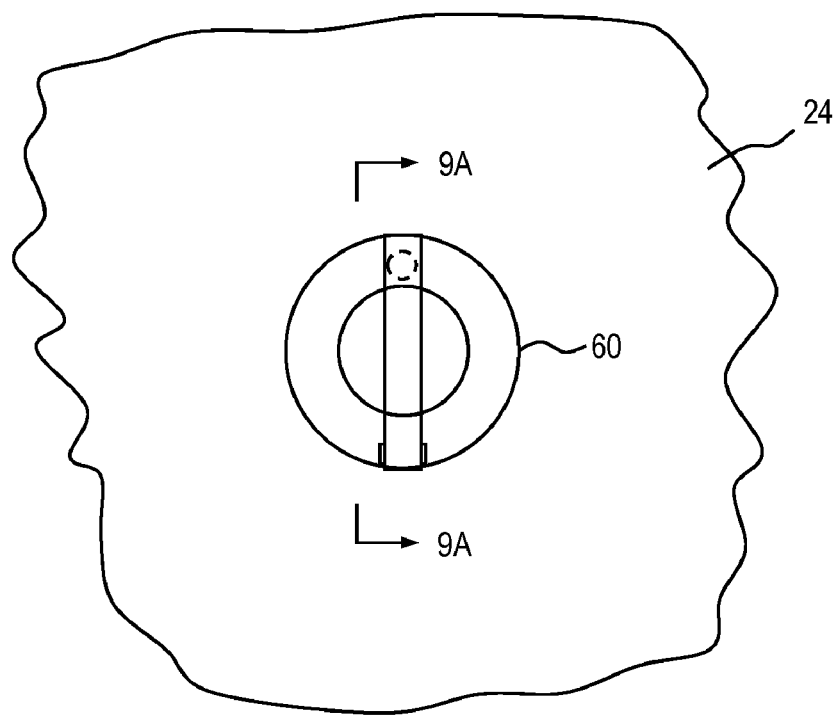
FIG. 8 is a bottom plan view of a fuel cargo jettison valve according to an embodiment of the present invention.
Figure 10:
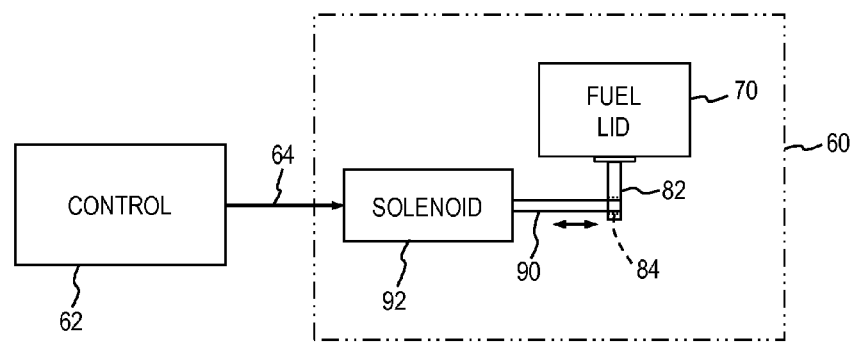
FIG. 10 is a schematic diagram showing further details of the fuel jettison subsystem of FIG. 7.

With reference to FIGS. 8 through 10 together, when jettison valve 60 is to be opened an operator operates control 62, which in turn actuates solenoid 92 via linkage 64. Output shaft 90 moves away from aperture 84 of locking tab 82, allowing biasing member 86 to urge link 74 to pivot about support 78, positively moving lid 70 away from opening 68 and thus exposing the opening, allowing fuel in reservoir 50 to be rapidly discharged. Biasing member 86 aids to urge lid 70 away from opening 68, ensuring the operation of the jettison valve under low-temperature and icing environmental conditions. It should be noted that control 62, linkage 64 and solenoid 92 may be realized using mechanical, electrical or pneumatic components within the scope of the invention.

Details of fuel cargo vent subsystem 20, shown in FIG. 3, comprises a hopper fuel tank vent 94, a secondary bulkhead vent 96 and a reservoir vent 98. Hopper fuel tank vent 94 includes a vent fitting 100 in communication with hopper fuel tank 14, a hollow vent line 102 extending away from the vent fitting and being coupled to the exterior of aircraft 12. Vent 96 for secondary bulkhead 43 also includes one or more vent fittings 100 and vent lines 102. In addition, a space 104 between a lower fuselage portion 106 of fuselage 24 and the top portion 52 of reservoir 50 includes reservoir vent 98, one or more vent fittings 100 and vent lines 102. Vent fittings 100 may be made of any suitable material including, without limitation, Teflon® material available from E. I. du Pont de Nemours and Company of Wilmington, Del. Vent lines 102 may be made from nylon, such as ¼ inch nylon tubing. Vent system 20 also includes at least one vent valve 36 (FIG. 2) and a pressure relief valve 38 (FIG. 2) coupled to each of hopper fuel tank 14 and reservoir 50. Vent valve 36 and pressure relief valve 38 each open at a predetermined pressure. Vent system 20 may further include a suction relief valve such as suction valve 66 (FIG. 7). Vent system 20 prevents the buildup of either positive and negative air pressure in fuel tank 14 and reservoir 50 due to fuel expansion and contraction due to changes in temperature, and due to changes in the altitude of aircraft 12.

Figure 11:
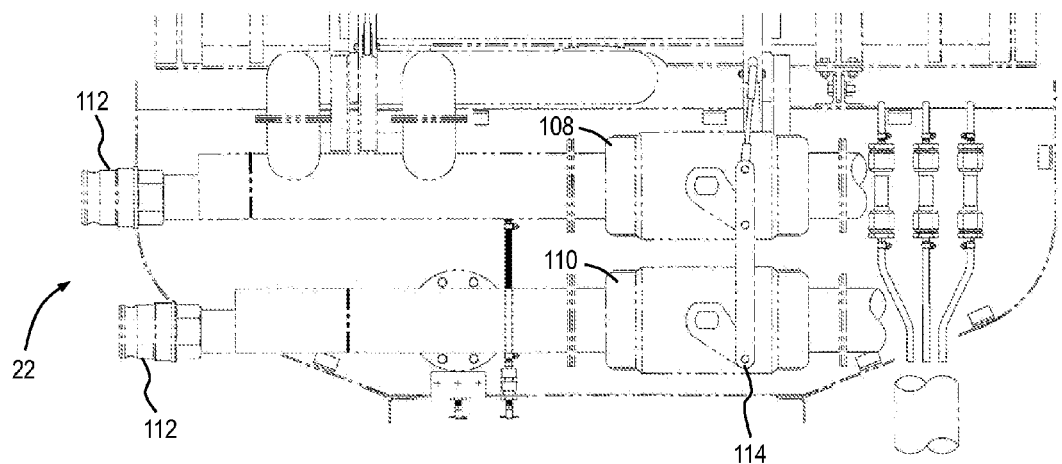
FIG. 11 is a side elevational view of a fuel offload subsystem of the system of FIG. 1.
Figure 12:
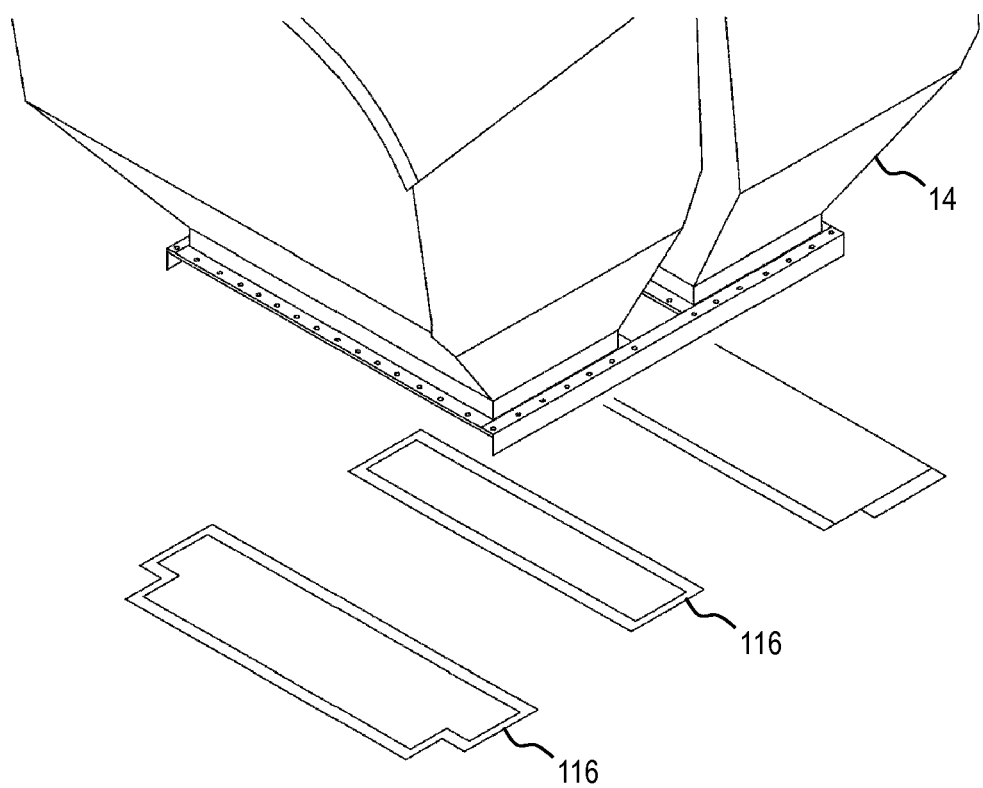
FIG. 12 shows a vapour barrier for the hopper fuel tank of FIG. 2

Referring now to FIGS. 1, 7 and 11, fuel cargo offload subsystem 22 includes a hopper fuel tank offload valve 108 in communication with hopper fuel tank 14. Fuel cargo offload subsystem 22 further includes a reservoir offload valve 110 in communication with reservoir 50. Each of valves 108, 110 includes a hose coupler 112. Coupler 112 facilitates the selectable attachment of a fuel hose (not shown) for removal of fuel from hopper fuel tank 14 and reservoir 50. An offload valve control linkage 114, which extends to pilot compartment 26 (FIG. 1) selectably controls the opening of valves 108, 110.

With reference to FIGS. 1, 3, 4 and 12, in some embodiments hopper fuel tank 14 may include one or more vapour barriers 116 between a lower portion 118 of the fuel tank and lower fuselage portion 106. Vapour barriers 116 surround a space between lower fuel tank portion 118 and lower fuselage portion 106 to prevent fume from entering fuselage 24. Vapour barriers may be made from cloth conforming to specification MIL-PRF-20696F. Other materials may include, without limitation, rubber, EPDM, nitrile, buna, neoprene, flexible graphite, silicone, metal, mica, felt, plastic polymer such as Teflon® (PTFE), urethane, and ethylene propylene (EP). Vapour barriers 116 may be made from sheet material or may be applied as a liquid gasket, as appropriate to the material selected.

Referring now to FIGS. 1 through 12 together, in operation, flammable liquids such as fuel may be loaded into either or both hopper fuel tank 14 or reservoir 50 by removing the appropriate filler cap 34 (FIG. 2). A fuel hose is inserted into a select fill port 32. Venting during the load operation is accomplished though fill port 32. After aircraft 12 has reached its offload point appropriate fuel offload hoses (not shown) are coupled to hose couplers 112 (FIG. 11). Offload valve control linkage 114 is actuated, opening valves 108, 110 to drain tank 14 and reservoir 50. If an external pump (not shown) is used for offloading fuel, it is preferable that caps 34 be removed first, to allow for adequate venting of tank 14 and reservoir 50 during the offloading operation. If caps 34 are not removed before pumping fuel from tank 14 and reservoir 50 suction valves 66 (FIG. 7) may open due to the resulting negative pressure in the tank and/or reservoir. Similarly, pressure relief valves 38 will open in the event that a fill pump is inadvertently connected to hose couplers 112 with fill caps 34 installed.

System 10 may carry a variety of flammable liquids within the scope of the invention including, without limitation, aviation fuel, jet fuel, automobile fuel, kerosene and diesel fuel.

System 10 further includes a landing gear 120, shown in FIGS. 1 and 5. Landing gear 120 is sized and shaped, and made of a select material to allow aircraft 12 to bear the weight of flammable liquids stored in hopper fuel tank 14 and reservoir 50 during all flight phases, including takeoff and landing. This is in contrast to typical aircraft operations where the aircraft takes off with a full load of fuel but consumes a significant portion of the fuel prior to landing. In one embodiment of the present invention landing gear 120 is made of spring steel.

Aircraft 12 may further include large tundra-type tires 122, shown in FIGS. 1 and 5. Tundra tires 122 allow aircraft 12 to operate from unimproved surfaces such as dirt, grass and gravel.

While this invention has been shown and described with respect to a detailed embodiment thereof, it will be understood by those skilled in the art that changes in form and detail thereof may be made without departing from the scope of the claims of the invention.

What is claimed is:

1. A system for transport of flammable liquids using an aircraft, comprising:
    a fuel tank for storing flammable liquids, the fuel tank being joined to the aircraft, having a first selectably closable fill port, and further including a first selectably closable discharge port;
    a reservoir for storing flammable liquids independent of the fuel tank, the reservoir being joined to the aircraft, having a second selectably closable fill port and further including a second selectably closable discharge port; and
    a fuel jettison subsystem coupled between an interior portion and an exterior portion of the reservoir to selectably expel fuel from the reservoir to an exterior portion of the aircraft, the fuel jettison subsystem including:
        a first jettison valve opening formed in the reservoir;
        a first lid selectably closing off the first jettison valve opening;
        a first biasing member to urge the first lid away from the first jettison valve opening;
        a first solenoid to retain the first lid in the first jettison valve opening when unactuated and to release the first lid when actuated, and
        a jettison linkage coupled to the first solenoid, the jettison linkage being operable to selectably actuate the first solenoid,
        the first lid being urged away from the first jettison valve opening by the first biasing member when the first solenoid is actuated by the jettison linkage.

2. The system of claim 1, further comprising:
    a first suction valve coupled between an interior portion and an exterior portion of the fuel tank to selectably admit air to the fuel tank, the first suction valve being closed below a predetermined negative pressure threshold in the fuel tank and being open when the pressure in the fuel tank exceeds the negative threshold; and
    a second suction valve coupled between the interior portion and the exterior portion of the reservoir to selectably admit air to the reservoir, the second suction valve being closed below a predetermined negative pressure threshold in the reservoir and being open when the pressure in the reservoir exceeds the negative threshold.

3. The system of claim 1, further comprising:
    a first pressure relief valve coupled between an interior portion and an exterior portion of the fuel tank to selectably expel at least one of air and fuel vapours from the fuel tank, the first pressure relief valve being closed below a predetermined positive pressure threshold in the fuel tank and being open when the pressure in the fuel tank exceeds the positive threshold; and
    a second pressure relief valve coupled between the interior portion and the exterior portion of the reservoir to selectably expel at least one of air and fuel vapours from the reservoir, the second pressure relief valve being closed below a predetermined positive pressure threshold in the reservoir and being open when the pressure in the reservoir exceeds the positive threshold.

4. The system of claim 1 wherein the fuel jettison subsystem selectably expels fuel from the fuel tank, the fuel jettison subsystem further comprising:
    a second jettison valve opening formed in the fuel tank;
    a second lid selectably closing off the second jettison valve opening;
    a second biasing member to urge the second lid away from the second jettison valve opening;
    a second solenoid to retain the second lid in the second jettison valve opening when unactuated and to release the second lid when actuated,
    the jettison linkage further being coupled to the second solenoid, the jettison linkage being operable to selectably actuate the second solenoid,
    the second lid being urged away from the second jettison valve opening by the second biasing member when the second solenoid is actuated by the jettison linkage.

5. The system of claim 1, further comprising:
    a first vent valve coupled between an interior portion and an exterior portion of the fuel tank, the first vent valve being closed when the aircraft is not level, accelerating and decelerating; and
    a second vent valve coupled between the interior portion and the exterior portion of the reservoir, the second vent valve being closed when the aircraft is not level, accelerating and decelerating.

6. The system of claim 1, further comprising a sidewall formed in the fuel tank and spaced apart from a bulkhead of the aircraft, the bulkhead and sidewall forming a secondary bulkhead.

7. The system of claim 6, further comprising a third vent valve coupled between an interior portion and an exterior portion of the secondary bulkhead, the third vent valve being closed when the aircraft is not level, accelerating and decelerating.

8. The system of claim 6, further including a drain between an interior portion of the secondary bulkhead and the exterior portion of the aircraft.

9. The system of claim 6, further including:
    a first vent fitting coupled between an interior portion and an exterior portion of the secondary bulkhead; and
    a first vent tube extending between the first vent fitting and the exterior portion of the aircraft.

10. The system of claim 1 wherein the fuel tank is made from at least one of aluminum and epoxy resin.

11. The system of claim 1 wherein the reservoir is made from aluminum.

12. The system of claim 1, further comprising an aerodynamic fairing detachably coupled to the aircraft, the aerodynamic fairing covering the reservoir.

13. The system of claim 12 wherein the aerodynamic fairing is made from at least one of aluminum and epoxy fiberglass.

14. The system of claim 1, further including:
    a second vent fitting coupled between an interior portion and an exterior portion of the fuel tank; and
    a second vent tube extending between the second vent fitting and the exterior portion of the aircraft.

15. The system of claim 1, further including:
    a third vent fitting coupled between the interior portion and the exterior portion of the reservoir; and
    a third vent tube extending between the third vent fitting and the exterior portion of the aircraft.

16. The system of claim 1 wherein the first and second discharge ports each further include a fuel offload valve to selectably close the discharge ports.

17. The system of claim 1 wherein the first and second discharge ports each further include a hose coupling.

18. The system of claim 1, further including at least one vapour barrier between the fuel tank and a fuselage of the aircraft, the vapour barrier deterring fumes from entering the fuselage.

19. A system for transport of flammable liquids using an aircraft, comprising:
- a fuel tank for storing flammable liquids, the fuel tank being joined to the aircraft, having a first selectably closable fill port, and further including a first selectably closable discharge port;
- a reservoir for storing flammable liquids independent of the fuel tank, the reservoir being joined to the aircraft, having a second selectably closable fill port and further including a second selectably closable discharge port;
- a fuel jettison subsystem coupled between an interior portion and an exterior portion of the reservoir to selectably expel fuel from the reservoir to an exterior portion of the aircraft, the fuel jettison subsystem including:
  - a first jettison valve opening formed in the reservoir;
  - a first lid selectably closing off the first jettison valve opening;
  - a first biasing member to urge the first lid away from the first jettison valve opening;
  - a first solenoid to retain the first lid in the first jettison valve opening when unactuated and to release the first lid when actuated, and
  - a jettison linkage coupled to the first solenoid, the jettison linkage being operable to selectably actuate the first solenoid,
  - the first lid being urged away from the first jettison valve opening by the first biasing member when the first solenoid is actuated by the jettison linkage.
- a first suction valve coupled between an interior portion and an exterior portion of the fuel tank to selectably admit air to the fuel tank, the first suction valve being closed below a predetermined negative pressure threshold in the fuel tank and being open when the pressure in the fuel tank exceeds the negative threshold;
- a second suction valve coupled between the interior portion and the exterior portion of the reservoir to selectably admit air to the reservoir, the second suction valve being closed below a predetermined negative pressure threshold in the reservoir and being open when the pressure in the reservoir exceeds the negative threshold;
- a first pressure relief valve coupled between the interior portion and the exterior portion of the fuel tank to selectably expel at least one of air and fuel vapours from the fuel tank, the first pressure relief valve being closed below a predetermined positive pressure threshold in the fuel tank and being open when the pressure in the fuel tank exceeds the positive threshold; and
- a second pressure relief valve coupled between the interior portion and the exterior portion of the reservoir to selectably expel at least one of air and fuel vapours from the reservoir, the second pressure relief valve being closed below a predetermined positive pressure threshold in the reservoir and being open when the pressure in the reservoir exceeds the positive threshold.

20. The system of claim 18, further comprising:
- a first vent valve coupled between the interior portion and the exterior of the fuel tank, the first vent valve being closed when the aircraft is not level, accelerating and decelerating; and
- a second vent valve coupled between the interior portion and the exterior of the reservoir, the second vent valve being closed when the aircraft is not level, accelerating and decelerating.

21. A method transporting flammable liquids with an aircraft, comprising the steps of:
- joining a fuel tank for storing flammable liquids to the aircraft, the fuel tank having a first selectably closable fill port, and further including a first selectably closable discharge port;
- joining a reservoir for storing flammable liquids to the aircraft, the reservoir being independent of the fuel tank, having a second selectably closable fill port and further including a second selectably closable discharge port; and
- coupling a fuel jettison subsystem between an interior portion and an exterior of the reservoir to selectably expel fuel from the reservoir to an exterior portion of the aircraft, the fuel jettison subsystem including:
  - a first jettison valve opening formed in the reservoir;
  - a first lid selectably closing off the first jettison valve opening;
  - a first biasing member to urge the first lid away from the first jettison valve opening;
  - a first solenoid to retain the first lid in the first jettison valve opening when unactuated and to release the first lid when actuated, and
  - a jettison linkage coupled to the first solenoid, the jettison linkage being operable to actuate the first solenoid,
  - the first lid being urged away from the first jettison valve opening by the first biasing member when the first solenoid is actuated by the jettison linkage.

* * * * *